United States Patent
Becker et al.

(10) Patent No.: US 10,652,437 B2
(45) Date of Patent: May 12, 2020

(54) VEHICLE CAMERA WITH ALUMINUM EXTRUDED BODY

(71) Applicant: MAGNA ELECTRONICS INC., Auburn Hills, MI (US)

(72) Inventors: Sonja M. Becker, Hösbach (DE); Achim Newiger, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/983,224

(22) Filed: May 18, 2018

(65) Prior Publication Data

US 2018/0338071 A1    Nov. 22, 2018

Related U.S. Application Data

(60) Provisional application No. 62/508,575, filed on May 19, 2017.

(51) Int. Cl.
*H04N 5/225* (2006.01)
*B60R 11/04* (2006.01)
*H04N 7/18* (2006.01)

(52) U.S. Cl.
CPC .......... *H04N 5/2252* (2013.01); *B60R 11/04* (2013.01); *H04N 5/2257* (2013.01); *H04N 5/2253* (2013.01); *H04N 5/2254* (2013.01); *H04N 7/181* (2013.01); *H04N 7/183* (2013.01)

(58) Field of Classification Search
None
See application file for complete search history.

(56) References Cited

U.S. PATENT DOCUMENTS

| | | |
|---|---|---|
| 4,634,884 A | 1/1987 | Hayashimoto et al. |
| 5,550,677 A | 8/1996 | Schofield et al. |
| 5,670,935 A | 9/1997 | Schofield et al. |
| 5,949,331 A | 9/1999 | Schofield et al. |
| 6,326,613 B1 | 12/2001 | Heslin et al. |
| 6,824,281 B2 | 11/2004 | Schofield et al. |

(Continued)

FOREIGN PATENT DOCUMENTS

WO    WO-2016180875 A1 * 11/2016 ........... H04N 5/2252

OTHER PUBLICATIONS

Michael Troughton, Handbook of Plastics Joining (Second Edition) A Practical Guide 2009, ISBN: 978-0-8155-1581-4, pp. 195-200 (Year: 2009).*

(Continued)

*Primary Examiner* — Quan Pham
(74) *Attorney, Agent, or Firm* — Honigman LLP

(57) ABSTRACT

A method of assembling a camera for a vehicular vision system includes providing a camera housing and forming a post at an interior portion of the camera housing, and positioning a printed circuit board in the camera housing so that the post is received through a hole through the printed circuit board such that a protruding end of the post protrudes from the side of the printed circuit board opposite the imager. Circuitry disposed at one side of the printed circuit board includes an imager. The protruding end of the post is adapted to limit retraction of the post from the hole through the printed circuit board so as to secure the printed circuit board relative to the post and the camera housing. A lens is provided at the camera housing.

16 Claims, 3 Drawing Sheets

FIG. 3

(56) References Cited

U.S. PATENT DOCUMENTS

| | | | |
|---|---|---|---|
| 7,480,149 B2 | 1/2009 | DeWard et al. | |
| 8,542,451 B2 | 9/2013 | Lu et al. | |
| 9,233,641 B2 | 1/2016 | Sesti et al. | |
| 9,674,414 B1* | 6/2017 | Molin | H04N 5/2254 |
| 2005/0041098 A1* | 2/2005 | Tan | H04N 5/2253 348/95 |
| 2005/0285973 A1 | 12/2005 | Singh et al. | |
| 2006/0050018 A1 | 3/2006 | Hutzel et al. | |
| 2009/0295181 A1 | 12/2009 | Lawlor et al. | |
| 2010/0097519 A1 | 4/2010 | Byrne et al. | |
| 2013/0242099 A1 | 9/2013 | Sauer et al. | |
| 2014/0160284 A1 | 6/2014 | Achenbach et al. | |
| 2014/0298642 A1 | 10/2014 | Sesti et al. | |
| 2014/0313337 A1* | 10/2014 | Devota | B60R 11/04 348/148 |
| 2014/0362285 A1 | 12/2014 | Min et al. | |
| 2014/0373345 A1 | 12/2014 | Steigerwald | |
| 2015/0124098 A1 | 5/2015 | Winden et al. | |
| 2015/0222795 A1 | 8/2015 | Sauer et al. | |
| 2015/0266430 A1 | 9/2015 | Mleczko et al. | |
| 2015/0365569 A1 | 12/2015 | Mai et al. | |
| 2016/0037028 A1 | 2/2016 | Biemer | |
| 2016/0234410 A1* | 8/2016 | Das | G02B 7/02 |
| 2016/0268716 A1 | 9/2016 | Conger et al. | |
| 2017/0012069 A1 | 1/2017 | Rudmann et al. | |
| 2017/0125938 A1 | 5/2017 | Riedel et al. | |
| 2017/0126938 A1 | 5/2017 | Newiger | |
| 2017/0133811 A1 | 5/2017 | Conger et al. | |
| 2017/0201661 A1 | 7/2017 | Conger | |
| 2017/0295306 A1 | 10/2017 | Mleczko | |
| 2017/0302829 A1 | 10/2017 | Mleczko et al. | |
| 2018/0013935 A1 | 1/2018 | Kunze et al. | |
| 2018/0048857 A1* | 2/2018 | Maekawa | H05K 9/002 |
| 2018/0072239 A1 | 3/2018 | Wienecke et al. | |
| 2018/0287306 A1* | 10/2018 | Grimes | H04N 5/2252 |

OTHER PUBLICATIONS

Bill Reed, "Shedding Light on the Plastic Staking Process", Oct. 3, 2014, Assembly Magazine at "https://www.assemblymag.com/articles/92442-shedding-light-on-the-plastic-staking-process?iframe=1" (Year: 2014).*

CaptainEek, Staking (manufacturing), Wikipedia at "https://en.wikipedia.org/w/index.php?title=Staking_(manufacturing)&oldid=882010456" (Year: 2019).*

* cited by examiner

US 10,652,437 B2

VEHICLE CAMERA WITH ALUMINUM EXTRUDED BODY

CROSS REFERENCE TO RELATED APPLICATION

The present application claims the filing benefits of U.S. provisional application Ser. No. 62/508,575, filed May 19, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a camera for a driving assistance system or vision system or imaging system for a vehicle that captures image data representative of images exterior of the vehicle. The camera includes and method of assembling a camera includes a metallic body, such as an extruded aluminum body, with posts formed as part of the body. The posts are inserted through holes in the printed circuit board when the PCB is inserted into the body, and the ends of the posts are then flattened (such as via punching or vibration welding or the like) to secure the PCB at the posts. Also, a rear cover element may be disposed at the rear of the body to seal the body. The rear cover element may include one or more posts formed as part of the cover element, and the posts are inserted through holes in a connector structure when the connector structure is disposed at the rear cover element so as to receive electrically conductive terminals (that are electrically connected to circuitry on the PCB) therein for electrical connection to a wire harness of the vehicle. The ends of the posts are then flattened to secure the connector structure at the posts.

These and other objects, advantages, purposes and features of the present invention will become apparent upon review of the following specification in conjunction with the drawings.

Figure 1:
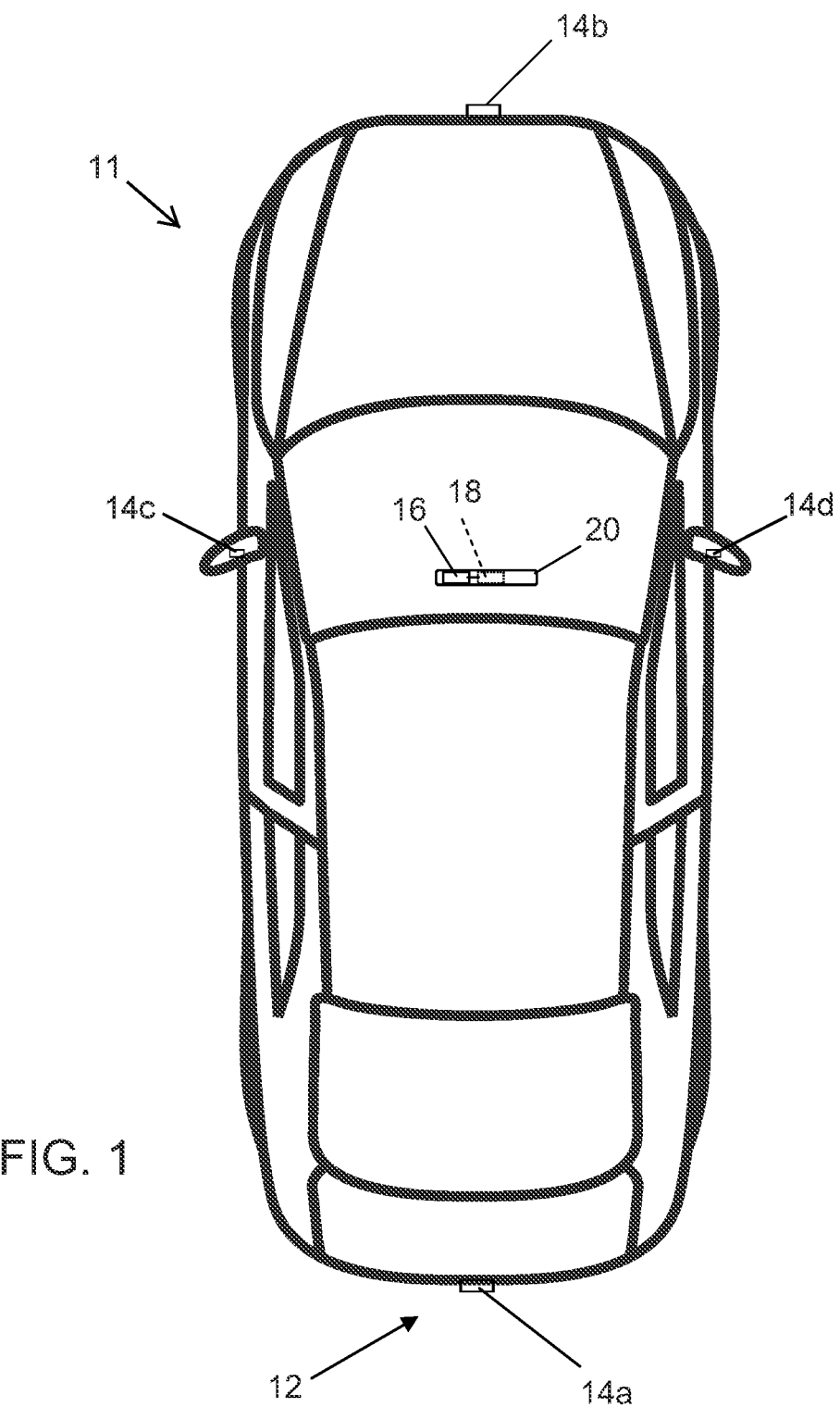
FIG. 1 is a plan view of a vehicle with a vision system that incorporates cameras in accordance with the present invention.

LEGEND 1 lens barrel
2 lens holder structure
3A aluminum rivet
3B aluminum post
4 imager PCB
5 connector PCB
6 camera housing rear lid
7 connector pins
8 connector portion piece with customer contour
9A plastic post
9B plastic rivet
10 vehicle camera according the invention

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Referring now to the drawings and the illustrative embodiments depicted therein, a vehicle 11 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

In U.S. Publication No. US-2017-0126938, which is hereby incorporated herein by reference in its entirety, vehicle camera housings with single point fixated PCBs are disclosed. As one aspect of that invention, fixation points made as posts or protrusion extending from the lens holder for being received at or at least partially received at an aperture or structure of the PCB are disclosed as well. Beside plastics and steel as optional materials for the lens holder structure, sintered aluminum is named. As named options, the fixation point may comprise a screw, glue or rivet. As an option, the post like structure may be formed out of the lens holder material.

Figure 2:
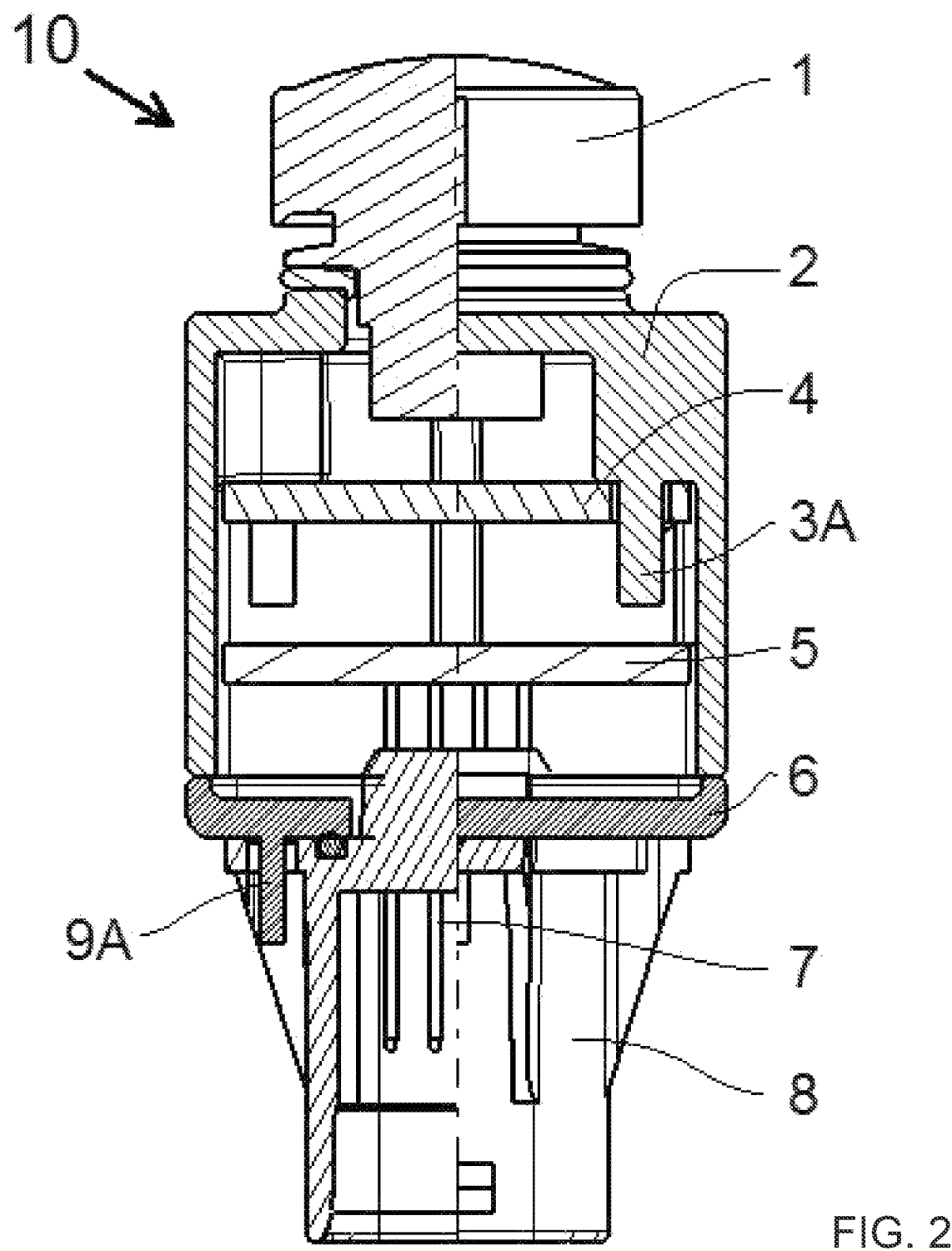
FIG. 2 is a sectional view of a camera having a formed body and rear cover element in accordance with the present invention, shown with the posts in their formed non-flattened state.
Figure 3:
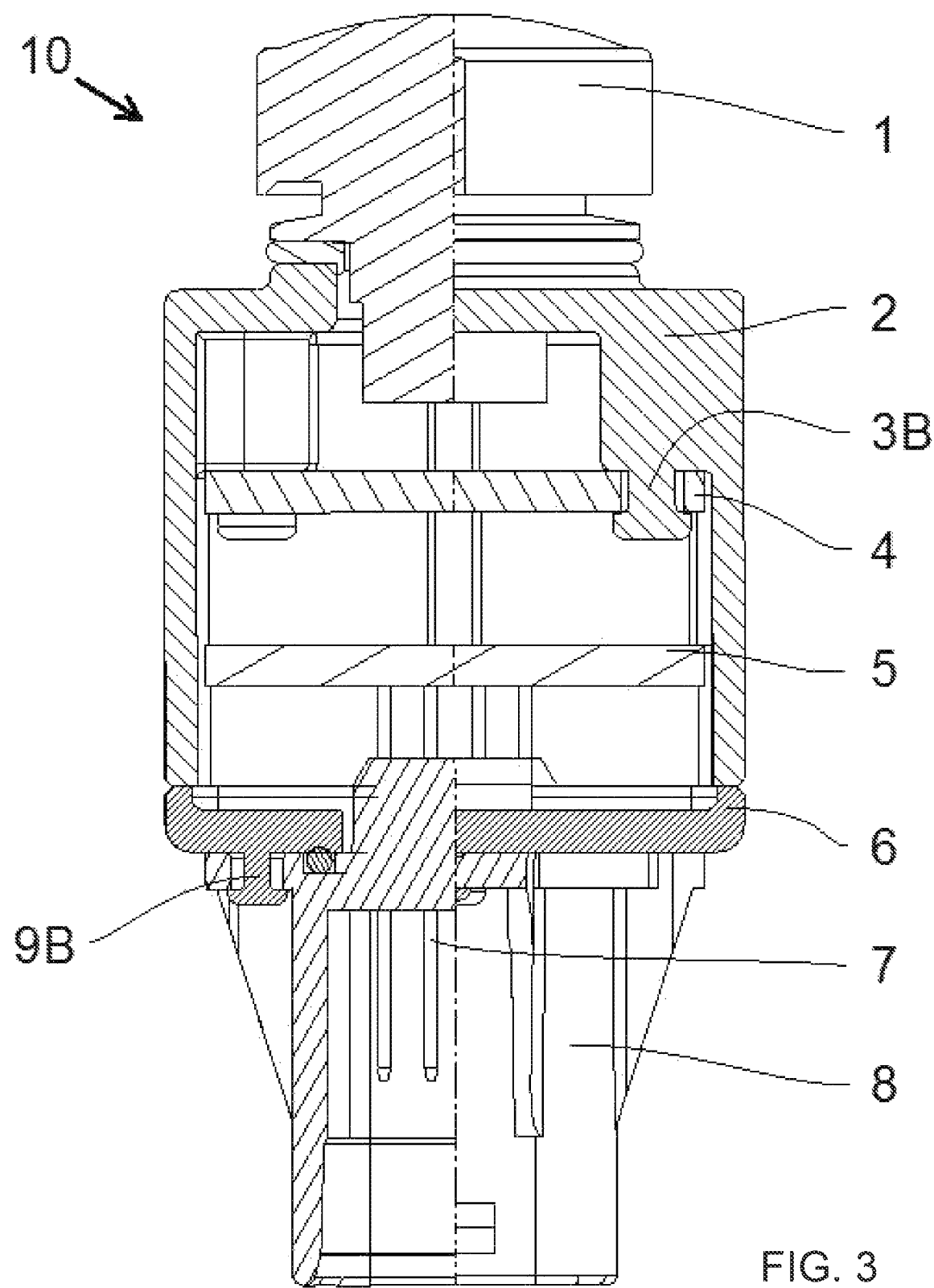
FIG. 3 is a sectional view of another camera having the formed body and rear cover element in accordance with the present invention, shown with the posts flattened to secure the PCB in the body and to secure the connector structure at the rear cover element.

FIGS. 2 and 3 show an advanced (compared to U.S. Publication No. US-2017-0126938) vehicle camera housing 10 in accordance with the present invention. The lens holder structure 2 may be made by impact extrusion out of aluminum. That forming method allows it to punch out posts or protrusions 3A (in FIG. 2) which may be used as rivet 3B (in FIG. 3) by turning it into a flat form or widened end or form, such as into a mushroom like shape after inserting a first printed circuit board or imager printed circuit board (PCB) 4, which has a through hole for receiving the post. The flattening or widening of the end of the post to a rivet-type shape or form may be done by punching or vibration welding. A vibration welding stamp may heat the post locally, by that just it becomes formable, and can be formed to the widened end shape or mushroom shape.

Optionally, there is a second PCB or connecting PCB 5 attached by one or more aluminum rivets formed in the manner as described above. Optionally, a separate connector [customer contour] portion piece 8 may be attached to the lens holder 2 or to an optional extra camera housing rear lid piece 6 by a one or more rivets formed in the manner as described above. The optional camera housing rear lid may optionally comprise aluminum.

Optionally, the camera housing rear lid piece 6 may be out of out of a plastic molding (accordingly shown in FIGS. 2 and 3) and the rivet 9B for attaching the connector [customer contour] portion piece 8 may be formed out of this plastic molding, such as, for example, PBT-GF 15, optionally flattened by hot stamping. In FIG. 2, the originating post 9A is shown, and in FIG. 3, the flattened rivet 9B is shown.

Thus, the camera and method of assembling a camera of the present invention includes a metallic body, such as an extruded aluminum body, with posts formed as part of the body. The posts are inserted through holes in the printed circuit board when the PCB is inserted into the body, and the ends of the posts are then flattened to secure the PCB at the posts. The flattening of the posts may be via punching or vibration welding, such as after heating the post region to enhance malleability of the posts. The camera thus is assembled without fasteners holding the PCB in place in the camera body.

Also, a rear cover element may be disposed at the rear of the body to seal the body. The rear cover element may include one or more posts formed as part of the cover element. The posts are inserted through holes in a connector structure when the connector structure is disposed at the rear cover element so as to receive electrically conductive terminals (that are electrically connected to circuitry on the PCB) therein for electrical connection to a wire harness of the vehicle. The ends of the posts are then flattened to secure the connector structure at the posts. The flattening of the posts may be via hot stamping, such as after heating the post region to enhance malleability of the posts. The camera thus is assembled without fasteners holding the connector structure in place at the camera body or rear cover element.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352;

US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The camera thus may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties. Optionally, the printed circuit board (or boards) may use a single point fixation, such as by utilizing aspects of the cameras described in U.S. Publication No. US-2017-0126938 (which is hereby incorporated herein by reference in its entirety) and optionally the printed circuit board (or boards) may be fixated by a spring element, such as by utilizing aspects of the cameras described in U.S. Publication No. US-2018-0013935, which is hereby incorporated herein by reference in its entirety.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method of assembling a camera for a vision system for a vehicle, said method comprising:
   providing a metallic camera housing;
   wherein providing the metallic camera housing comprises forming at least one housing post at an interior portion of the metallic camera housing, the at least one housing post having a protruding end;
   providing a printed circuit board having circuitry disposed thereat, wherein the printed circuit board has a first side and a second side opposite the first side, wherein the circuitry includes an imager disposed at the first side of the printed circuit board;
   positioning the printed circuit board in the metallic camera housing with the imager and the first side of the printed circuit board facing toward a lens holding end of the metallic camera housing;
   wherein positioning the printed circuit board in the metallic camera housing comprises receiving the at least one housing post through a respective at least one hole through the printed circuit board such that the protruding end of the at least one housing post protrudes from the second side of the printed circuit board;
   adapting the protruding end of the at least one housing post to limit retraction of the at least one housing post from the at least one hole through the printed circuit board and to secure the printed circuit board relative to the at least one housing post and the metallic camera housing and the lens;
   wherein adapting the protruding end of the at least one housing post of the metallic camera housing comprises vibration welding;
   providing a lens at the lens holding end of the metallic camera housing;
   providing a rear cover element and attaching the rear cover element at a rear of the metallic camera housing;
   wherein providing a rear cover element comprises forming a rear cover element with a cover post protruding rearward therefrom;
   providing a connecting portion that receives connecting terminals therein and is configured to connect to a wire harness of a vehicle when the camera is mounted at the vehicle;
   electrically connecting the connecting terminals to circuitry of the printed circuit board and attaching the connecting portion at the rear cover element; and
   wherein attaching the connecting portion at the rear cover element comprises, after inserting the cover post of the rear cover element through a hole through a portion of the connecting portion, heat stamping a protruding end of the cover post to widen the protruding end of the cover post of the rear cover element to limit retraction of the cover post from the hole through the portion of the connecting portion to secure the connecting portion relative to the rear cover element and relative to the cover post of the rear cover element.

2. The method of claim 1, wherein adapting the protruding end of the at least one housing post comprises widening the protruding end of the at least one housing post.

3. The method of claim 2, wherein widening the protruding end of the at least one housing post comprises widening the protruding end such that the widened protruding end contacts the second side of the printed circuit board and clamps the printed circuit board between the widened protruding end and at least one interior portion of the metallic camera housing that engages the first side of the printed circuit board.

4. The method of claim 1, wherein providing the lens comprises optically aligning the lens with the imager and retaining the lens relative to the imager when optically aligned therewith.

5. The method of claim 1, wherein providing a metallic camera housing comprises extruding an aluminum camera housing.

6. The method of claim 1, comprising providing a second printed circuit board having circuitry electrically connected to the connecting terminals, and wherein circuitry of the printed circuit board and circuitry of the second printed circuit board are electrically connected via at least one electrically connecting element.

7. A method of assembling a camera for a vision system for a vehicle, said method comprising:
   providing a metallic camera housing;
   wherein providing the metallic camera housing comprises forming two housing posts at an interior portion of the metallic camera housing, each of the housing posts protruding from a respective support surface and having a protruding end;

providing a printed circuit board having circuitry disposed thereat, wherein the printed circuit board has a first side and a second side opposite the first side, wherein the circuitry includes an imager disposed at the first side of the printed circuit board;

positioning the printed circuit board in the metallic camera housing with the imager and the first side of the printed circuit board facing toward a lens holding end of the metallic camera housing, wherein, with the printed circuit board positioned in the metallic camera housing, the first side of the printed circuit board engages the support surfaces;

wherein positioning the printed circuit board in the metallic camera housing comprises receiving the housing posts through respective holes through the printed circuit board such that the protruding ends of the housing posts protrude from the second side of the printed circuit board;

adapting the protruding ends of the housing posts to limit movement of the printed circuit board relative to the housing posts and to secure the printed circuit board relative to the housing posts and the metallic camera housing;

wherein adapting the protruding ends of housing posts of the metallic camera housing comprises vibration welding;

providing a rear cover element and attaching the rear cover element at a rear of the metallic camera housing; and providing a lens at the lens holding end of the metallic camera housing;

wherein providing a rear cover element comprises forming a rear cover element with a cover post protruding rearward therefrom;

providing a connecting portion that receives connecting terminals therein and is configured to connect to a wire harness of a vehicle when the camera is mounted at the vehicle;

electrically connecting the connecting terminals to circuitry of the printed circuit board and attaching the connecting portion at the rear cover element; and wherein attaching the connecting portion at the rear cover element comprises, after inserting the cover post of the rear cover element through a hole through a portion of the connecting portion, heat stamping a protruding end of the cover post to widen the protruding end of the cover post of the rear cover element to limit retraction of the cover post from the hole through the portion of the connecting portion to secure the connecting portion relative to the rear cover element and relative to the cover post of the rear cover element.

8. The method of claim 7, wherein adapting the protruding ends of the housing posts comprises widening the protruding ends of the housing posts.

9. The method of claim 8, wherein widening the protruding ends of the housing posts comprises widening the protruding ends such that the widened protruding ends contact the second side of the printed circuit board and clamp the printed circuit board between the widened protruding ends and the respective support surfaces of the metallic camera housing that engage the first side of the printed circuit board.

10. The method of claim 7, wherein providing the lens comprises optically aligning the lens with the imager and retaining the lens relative to the imager when optically aligned therewith.

11. The method of claim 7, wherein providing a metallic camera housing comprises extruding an aluminum camera housing.

12. The method of claim 7, wherein adapting the protruding ends of the housing posts comprises punching or vibration welding the protruding ends of the housing posts.

13. A method of assembling a camera for a vision system for a vehicle, said method comprising:

providing a metallic camera housing;

wherein providing the metallic camera housing comprises forming two housing posts at an interior portion of the metallic camera housing, each of the housing posts protruding from a respective support surface and having a protruding end;

providing a printed circuit board having circuitry disposed thereat, wherein the printed circuit board has a first side and a second side opposite the first side, wherein the circuitry includes an imager disposed at the first side of the printed circuit board;

positioning the printed circuit board in the metallic camera housing with the imager and the first side of the printed circuit board facing toward a lens holding end of the metallic camera housing, wherein, with the printed circuit board positioned in the metallic camera housing, the first side of the printed circuit board engages the support surfaces;

wherein positioning the printed circuit board in the metallic camera housing comprises receiving the housing posts through respective holes through the printed circuit board such that the protruding ends of the housing posts protrude from the second side of the printed circuit board;

adapting the protruding ends of the housing posts to limit movement of the printed circuit board relative to the housing posts and to secure the printed circuit board relative to the housing posts and the metallic camera housing;

wherein adapting the protruding ends of the housing posts comprises widening the protruding ends via vibration welding such that the widened protruding ends contact the second side of the printed circuit board and clamp the printed circuit board between the widened protruding ends and the respective support surfaces of the metallic camera housing that engage the first side of the printed circuit board;

providing a rear cover element and attaching the rear cover element at a rear of the metallic camera housing, wherein the rear cover element has a cover post protruding rearward therefrom;

attaching a connecting portion at the rear cover element, wherein the connecting portion is configured to connect to a wire harness of a vehicle when the camera is mounted at the vehicle;

wherein attaching the connecting portion at the rear cover element comprises, after receiving the cover post of the rear cover element through a hole through a portion of the connecting portion, heat stamping a protruding end of the cover post to widen the protruding end of the cover post to limit retraction of the cover post from the hole through the portion of the connecting portion to secure the connecting portion relative to the rear cover element and the cover post of the rear cover element; and providing a lens at the lens holding end of the metallic camera housing.

14. The method of claim 13, wherein the connecting portion, when attached at the rear cover element, receives connecting terminals therein, and wherein the connecting terminals are electrically connected to circuitry of the printed circuit board.

15. The method of claim 13, wherein the rear cover element comprises a plastic rear cover element.

16. The method of claim 13, wherein providing a metallic camera housing comprises extruding an aluminum camera housing.

\* \* \* \* \*

UNITED STATES PATENT AND TRADEMARK OFFICE
CERTIFICATE OF CORRECTION

PATENT NO. : 10,652,437 B2
APPLICATION NO. : 15/983224
DATED : May 12, 2020
INVENTOR(S) : Sonja M. Becker et al.

Page 1 of 1

It is certified that error appears in the above-identified patent and that said Letters Patent is hereby corrected as shown below:

In the Claims

Column 7
Line 27, Claim 7, "ends of housing posts" should be --ends of the housing posts--

Signed and Sealed this
Twenty-third Day of June, 2020

Andrei Iancu
*Director of the United States Patent and Trademark Office*